United States Patent
Noh

(10) Patent No.: US 6,366,632 B1
(45) Date of Patent: Apr. 2, 2002

(54) ACCOUNTING FOR CLOCK SLEW IN SERIAL COMMUNICATIONS

(75) Inventor: Jae Noh, Berkely, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/368,204

(22) Filed: Aug. 4, 1999

(51) Int. Cl.[7] ............................................. H04L 20/00
(52) U.S. Cl. ........................................ 375/371; 375/377
(58) Field of Search ................................. 375/376, 373, 375/369, 222, 219, 377

(56) References Cited

U.S. PATENT DOCUMENTS

| | | | |
|---|---|---|---|
| 4,466,111 A | 8/1984 | Bennett ........................ | 375/362 |
| 5,131,015 A | 7/1992 | Benjaram et al. ........... | 375/377 |
| 5,500,620 A | 3/1996 | Brown et al. ................ | 329/300 |
| 5,627,858 A * | 5/1997 | Mak et al. ................... | 375/225 |
| 5,841,823 A | 11/1998 | Tuijn ............................ | 375/373 |
| 5,923,705 A | 7/1999 | Willkie et al. .............. | 375/220 |
| 6,044,121 A * | 3/2000 | Nolan et al. ................. | 375/354 |
| 6,181,912 B1 * | 1/2001 | Miller et al. ............... | 455/12.1 |

* cited by examiner

Primary Examiner—Tesfaldet Bocure
(74) Attorney, Agent, or Firm—Philip R. Wadsworth; Charles D. Brown; George C. Pappas

(57) ABSTRACT

A system and method for accounting for clock slew during autobauding. Upon identifying an AT command and the baud rate of the incoming data stream, the present invention accounts for clock slew in one of two ways, depending upon the baud rate of the incoming data stream. If the baud rate of the incoming data stream is 9600 or greater, the present invention accounts for slew by utilizing a feature associated with ASCII characters and RS-232 protocol, that is the stop bit being nicely framed on both sides by spaces. This feature is used to determine whether negative or positive clock slew exists. If negative clock slew exists and it is determined that negative clock slew falls within a certain threshold, a sample is skipped. If positive clock slew exists and falls within a certain threshold, positive clock slew is converted to negative clock slew by taking an extra sample. Clock slew is accounted for by reconstructing bits from an old sample and a new sample, based on the calculated slew value, to obtain an actual sample that eliminates deleterious effects of clock slew. When the baud rate of the incoming data stream is less than 9600, the present invention accounts for clock slew by taking a middle group of 8 samples from the start bit when multiple groups of 8 samples per bit exist. This is accomplished by searching for the next start bit. Once the next start bit is found, determining which group of 8 samples is a middle sample.

25 Claims, 8 Drawing Sheets

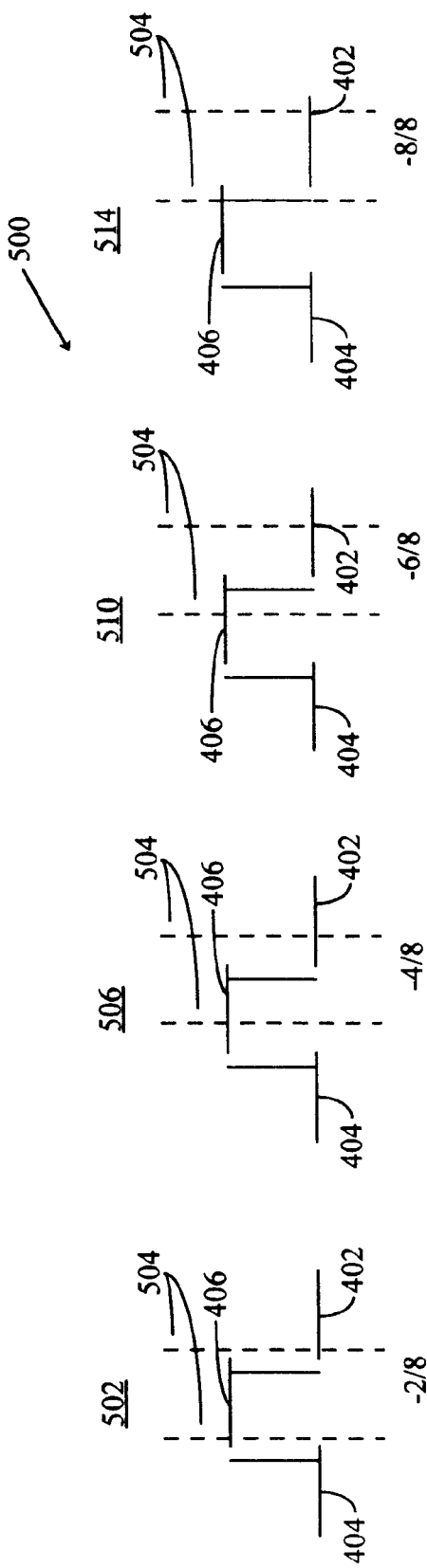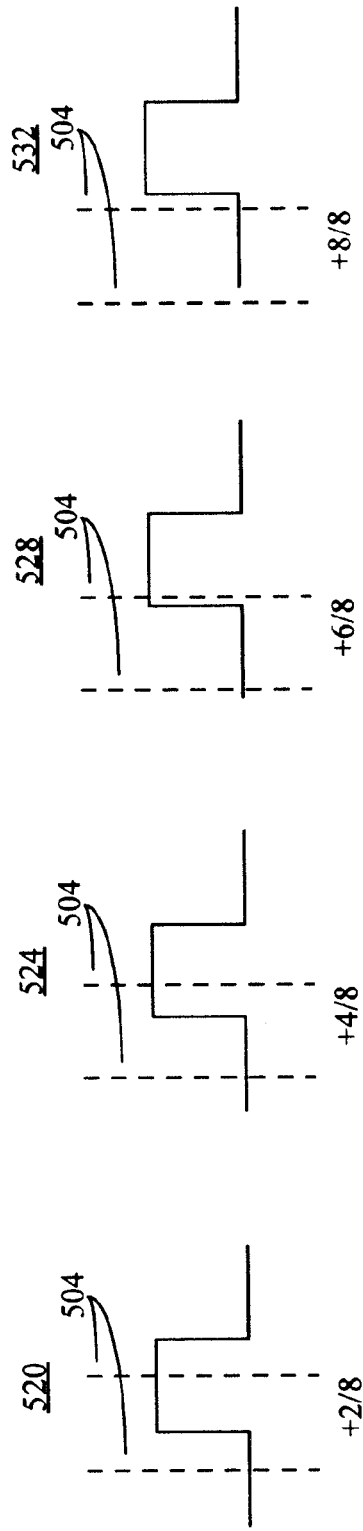
FIG. 5a: NEGATIVE SLEW
FIG. 5b: POSITIVE SLEW

ACCOUNTING FOR CLOCK SLEW IN SERIAL COMMUNICATIONS

CROSS-REFERENCE TO RELATED APPLICATIONS

The following applications of common assignee contain some common disclosure as the present application:

U.S. Patent Application entitled "UART Based Autobauding Without Data Loss", filed Jul. 18, 1996 in the name of QUALCOMM Incorporated, Ser. No. 08/684,346, now U.S. Pat. No. 5,923,705.

U.S. Patent Application entitled "Guaranteeing Clock Slew Correction in Point-to-Point Protocol Packet Detection Without Data Loss After Baud Rate Detection in Autobaud Mode", filed concurrently herewith, in the name of QUALCOMM Incorporated, Ser. No. 09/368,205 filed Aug. 4, 1999.

BACKGROUND OF THE INVENTION

1. Field of the Invention

The present invention relates to the field of mobile communications. More particularly, the present invention relates to a system and method for clock slew correction in serial transmission of AT commands to cellular telephones capable of receiving and transmitting data.

2. Related Art

In addition to voice transmission capabilities, cellular telephones now provide data services. A cellular telephone configured to receive and transmit data allows a user to remotely access the Internet, e-mail, facsimiles, and other data sources using a laptop computer and the cellular telephone. The data provided by the data source must be converted into signals appropriate for processing and transmission by the cellular telephone. Cellular telephones configured in accordance with time division multiple access (TDMA), frequency division multiple access (FDMA) or code division multiple access (CDMA) must convert the data to the appropriate format for their respective protocols.

To correctly process the data, the baud rate at which the data is transmitted to the cellular telephone (via data link such as serial port) must be determined. This process is referred to as autobauding. The cellular telephone must be able to identify the baud rate of the incoming data to effectively convert the data to the appropriate format for transmission.

To lessen power consumption and cut costs, universal asynchronous receive and transmit (UART) devices are used in cellular telephones to process incoming serial data. Usually these devices follow RS-232 protocol and only support the asynchronous portion of the standard. The UART operates in byte mode when the baud rate of the incoming data is known. In byte mode of operation, the UART automatically corrects for slew usually by means of phase locked loop hardware. In addition, the UART automatically strips off start and stop bits as well as checks parity (if any). Slew is the difference in clock rates between the transmitting clock and the receiving clock. The UART operates in sampling mode during autobaud. During autobaud, the UART, in QUALCOMM's Mobile Station Modem, samples the incoming serial data at a higher rate to determine the baud rate. When the UART operates in sampling mode, it does not account for slew nor does it strip off start and stop bits. In sampling mode, the UART simply takes 8 samples and presents the eight samples as a byte. The UART is set to a bit-rate such that a byte (a group of eight samples) corresponds to a bit at the highest bit-rate which is detected by autobauding. A bit which is sampled can very well be a start bit or a stop bit. After the starting byte and the baud rate have been determined, the UART needs to be set to the byte mode of operation to receive the remaining characters of the incoming data stream. A problem may arise if the UART exits out of sampling mode when a portion of a character has already been read into the UART before exiting. After the UART exits out of sampling mode into byte mode, the UART attempts its normal operations of looking for a start bit and a stop bit, accounting for clock slew, etc. If a portion of a data character was in the UART at the time the UART transitioned from sampling mode to byte mode of operation, the UART may interpret an actual data character as a start bit. When this occurs, the data will look like garbage until the next command comes along. In order for the incoming data stream to be reliable, the UART needs to remain in sampling mode for the entire command. While the UART remains in sampling mode, clock slew must be accounted for, otherwise, the data will be lost or misinterpreted and eventually will look like garbage.

What is needed is a system and method for providing reliable data during serial communications that corrects for slew when the UART is operating in sampling mode during autobauding.

SUMMARY OF THE INVENTION

The present invention solves the above mentioned problem by providing a system and method for accounting for clock slew during autobauding. Upon identifying an AT command and a baud rate for the incoming data stream, the present invention accounts for clock slew in one of two ways, depending upon the baud rate of the incoming data stream.

If the baud rate of the incoming data stream is 9600 or greater, the present invention accounts for slew by utilizing a feature associated with ASCII characters and RS-232 protocol. The feature is the stop bit being nicely framed on both sides by spaces. This feature is used to determine whether negative or positive clock slew exists. If negative clock slew exists and it is determined that the value of negative clock slew falls outside of a certain threshold, a sample is skipped. If positive clock slew exists and its value falls outside of a certain threshold, positive clock slew is converted to negative clock slew by taking an extra sample. Clock slew is accounted for by reconstructing bits from an old sample and a new sample, based on the calculated slew value, to obtain an actual sample that eliminates the deleterious effects of clock slew.

When the baud rate of the incoming data stream is less than 9600, the present invention accounts for clock slew by reading a middle group of 8 samples from the start bit of a character when multiple groups of 8 samples per bit exist. This is accomplished by searching for the next start bit. Once the next start bit is found, it is determined which group of 8 samples is a middle sample. The present invention counts over to the middle sample and reads the data from the middle sample to negate the effects of slew.

Further features and advantages of the invention, as well as the structure and operation of various embodiments of the invention, are described in detail below with reference to the accompanying drawings.

BRIEF DESCRIPTION OF THE FIGURES

The features, objects, and advantages of the present invention will become more apparent from the detailed description set forth below when taken in conjunction with the drawings in which like reference characters identify corresponding elements throughout. In the drawings, like reference numbers generally indicate identical, functionally similar, and/or structurally similar elements. The drawings in which an element first appears is indicated by the leftmost digit(s) in the corresponding reference number.

FIG. 5a is a diagram illustrating the severity of negative clock slew;

FIG. 5b is a diagram illustrating the severity of positive clock slew;

DETAILED DESCRIPTION OF THE PREFERRED EMBODIMENTS

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

The present invention is directed toward a system and method that accounts for clock slew during autobauding. After identifying a command type and a baud rate for an incoming data stream, the present invention accounts for clock slew in one of two ways, depending on the detected baud rate of the incoming data stream. When the baud rate is 9600 or greater, the present invention determines clock slew based on the stop bit because it is always nicely framed between two spaces. For baud rates less than 9600, the present invention negates clock slew by reading a center group of 8 samples from the start bit and all subsequent bits until centering is performed again for the next start bit.

Figure 1:
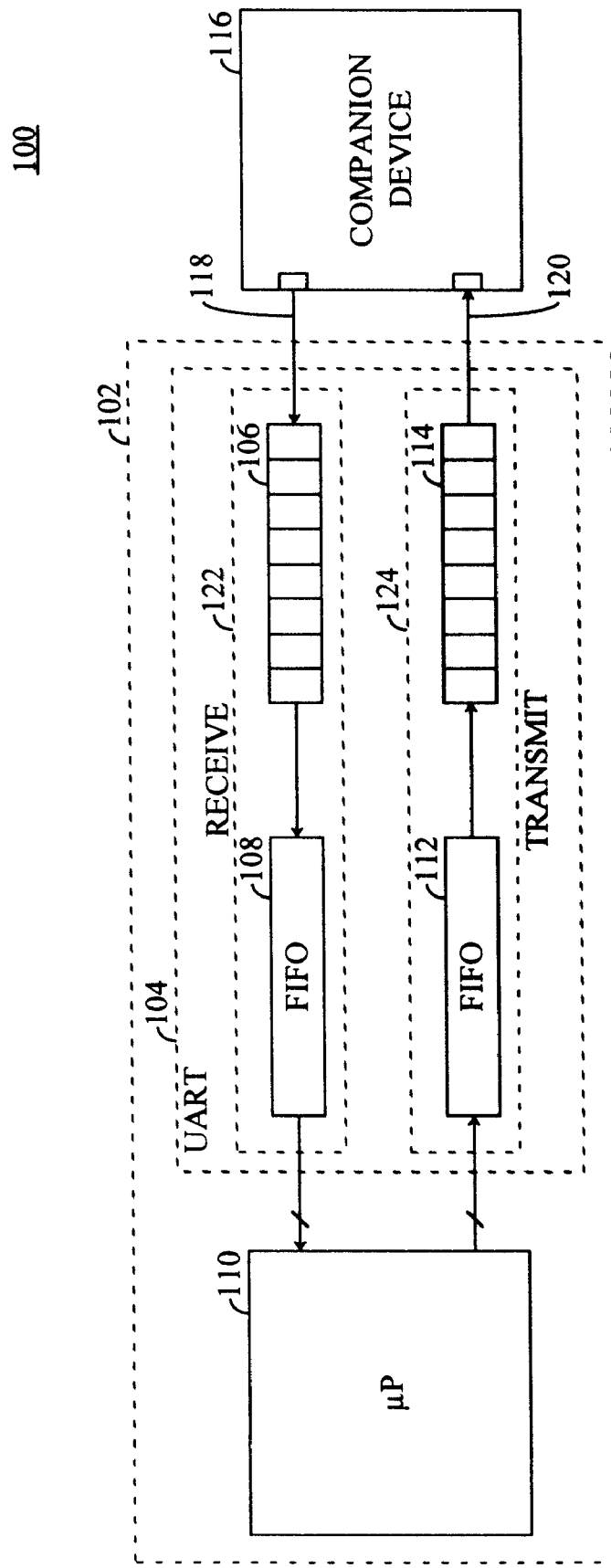
FIG. 1 is a block diagram illustrating an exemplary system in which the present invention is implemented.

FIG. 1 is a block diagram of an exemplary system 100 in which the present invention is implemented. The system 100 comprises a communications device 102, a companion device 116, and two serial connection cables 118 and 120. Serial connection cables 118 and 120 or equivalent communication links, such as infrared or radio frequency (RF) links, interconnect communications device 102 with companion device 116. In a preferred embodiment, communications device 102 is a cellular telephone and companion device 116 can be any type of data source such as a portable or non-portable computer, facsimile machine, personal digital assistant, etc.

The pertinent parts of communications device 102 are a universal asynchronous receiver/transmitter (UART) 104 and a microprocessor 110. UART 104 converts incoming serial data from companion device 116 via serial connection cable or equivalent communications link 118 into parallel data for input into microprocessor 110. Parallel data from microprocessor 110 is converted into serial data by UART 104 and transmitted to companion device 116 via serial connection cable or equivalent communications link 120.

UART 104 is comprised of two channels, a receive channel 122 and a transmit channel 124. Receive channel 122 comprises a shift register 106 coupled to a FIFO (first-in first out) storage device 108. Transmit channel 124 comprises a shift register 114 coupled to a FIFO storage device 112. Receive and transmit shift registers 106 and 114, respectively, are 8-bit shift registers. Receive and transmit FIFOs 108 and 112, respectively, are 64×8 bits wide. Both FIFOs 108 and 112 are used to store data. For incoming serial data, shift register 106 performs the serial to parallel conversion as it shifts the data left into FIFO 108. For outgoing parallel data from microprocessor 110, shift register 114 performs the parallel to serial conversion as it shifts data from FIFO 112 to the right. The first byte of data that enters FIFOs 108 and 112 is always the first byte of data retrieved by microprocessor 110 or shift register 114, respectively.

The serial transmission of data signals over serial cables 118 and 120 is performed using the EIA/TIA-RS-232E interface protocol. The EIA/TIA-RS-232E is provided by the Telecommunications Industry Association in a document entitled "ANSI/TIA/EIA-602-1992," dated June, 1992. When UART 104 operates in byte mode, shift register 106 looks for the start and stop bits from the incoming serial data and strips them off. The remaining data is shifted into FIFO 108 for input into microprocessor 110. When UART 104 operates in sampling mode, shift register 106 takes eight samples and shifts them into FIFO 108 without looking for the start and stop bits. The samples remain in FIFO 108 until microprocessor 110 retrieves the samples for processing. As FIFO 108 becomes sufficiently full, an interrupt signal is sent to microprocessor 110. Microprocessor 110 responds accordingly by retrieving all or a portion of the data. Samples retrieved by microprocessor 110 from UART 104 are converted to an appropriate data format for transmission using CDMA protocols. In a preferred embodiment, UART 104 is a QUALCOMM Incorporated MSM2 UART available from QUALCOMM Incorporated, the assignee of rights to the present invention. Microprocessor 110 also processes the data to account for slew when UART 104 operates in sampling mode. The processing will be described below with reference to FIGS. 7 and 8.

The starting byte of a command sequence is either an 'A', 'a', or a '~'. Autobaud, therefore, looks for an 'A', 'a', and a '~'. 'A' and 'a' represent the beginnings of an AT command. AT commands are comprised of all ASCII characters. RS-232, the EIA standard for serial transmission, requires the beginning of a character to be identified by a start bit. The start bit is always represented as a space (that is, a zero bit). The end of a character is identified by a stop bit. The stop bit is always represented as a mark (that is, a one bit). The most significant bit of an ASCII character is always a space. Thus, for ASCII characters, the stop bit is nicely framed by spaces.

Figure 2:
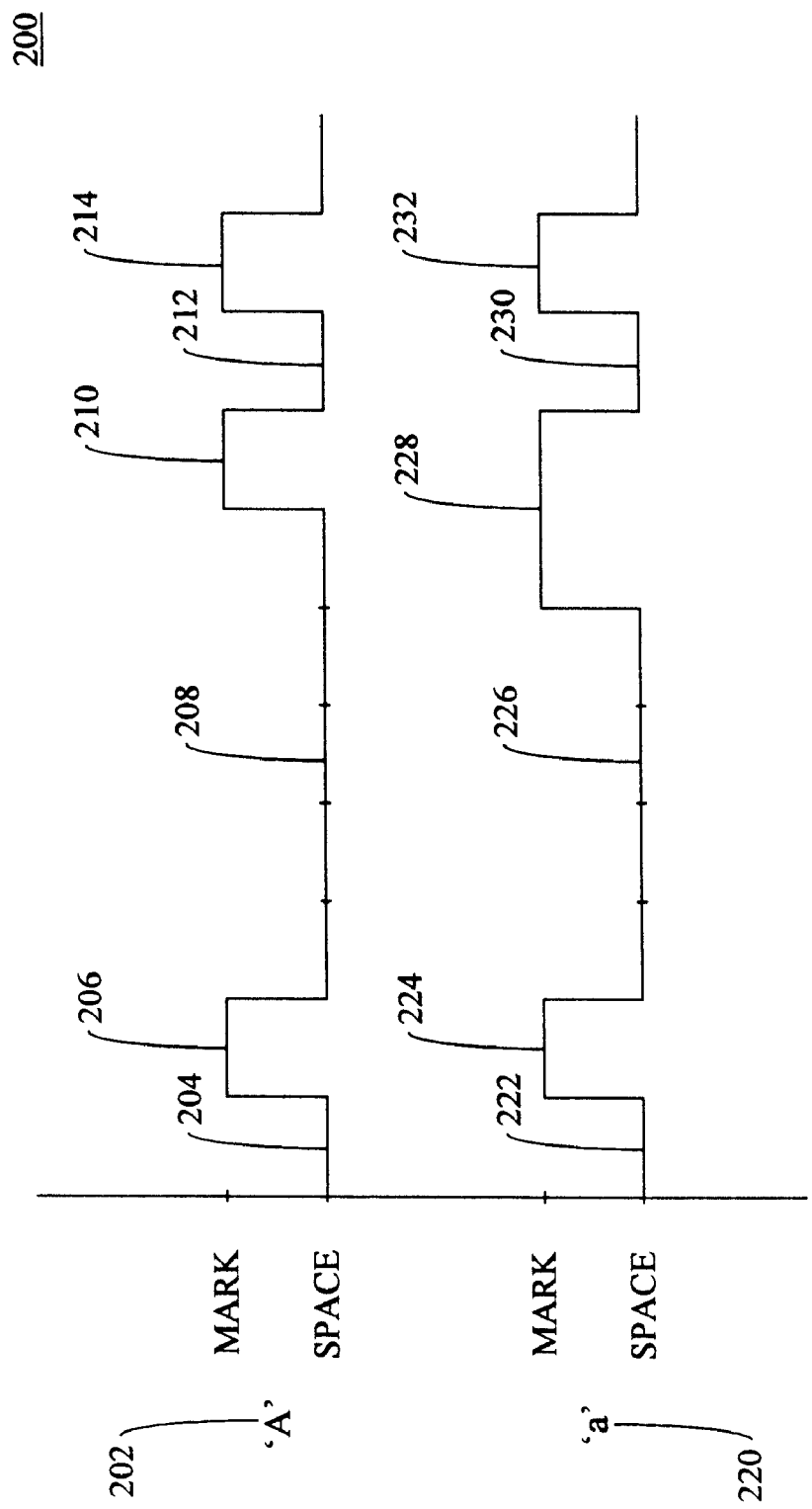
FIG. 2 is a diagram illustrating the starting character of an AT command.

FIG. 2 represents a diagram of the starting bytes for an AT command. As previously stated, the starting byte of an AT command can be an 'A' 202 or an 'a' 220. Both 'A' 202 and 'a' 220 include spaces and marks. Spaces represent zero bits and marks represent one bits. 'A' character 202 comprises a first space 204, a first marking 206, a second space 208, a second marking 210, a third space 212, and a third marking 214. First space 204 represents a start bit. First marking 206 represents the least significant bit (LSB). Second space 208 is comprised of five spaces. Second mark 210 contains one marking. Third space 212 is the most significant bit (MSB) and third marking 214 is the stop bit.

The 'a' character 220 comprises a first space 222, a first marking 224, a second space 226, a second marking 228, a third space 230, and a third marking 232. First space 222 represents the start bit. First mark 224 represents the LSB. Second space 226 comprises four spaces. Second mark 228 comprises two markings. Third space 230 is the MSB, and third marking 232 is the stop bit.

The '~', which is represented as a 0x7e flag in ASCII (not shown), represents a point-to-point protocol (PPP) packet. A system and method for guaranteeing clock slew correction in PPP packet detection is disclosed in copending application entitled, "Guaranteeing Clock Slew Correction in Point-to-Point Protocol Packet Detection Without Data Loss After Baud Rate Detection in Autobaud Mode", application Ser. No. 09/368,205, filed on Aug. 4, 1999, incorporated herein by reference in its entirety.

Each starting byte has a unique profile, and is, therefore, distinguishable by determining the relative placement of spacing bits and marking bits within the starting byte. The determination of whether the received samples correspond to an 'A', 'a', or '~' as well as the detection of the baud rate during autobauding is disclosed in copending application entitled "UART Based Autobauding Without Data Loss", Application No. 08/684,346, filed on Jul. 18, 1996, incorporated herein by reference in its entirety.

After the starting byte and the baud rate have been determined, UART 104 needs to be set to the byte mode of operation to receive the remaining characters of the incoming data stream. A problem may arise if UART 104 exits out of sampling mode when a portion of a character has already been read into UART 104. After UART 104 exits out of sampling mode into byte mode, UART 104 attempts its normal operations of looking for a start bit and a stop bit, accounting for clock slew, etc. If a portion of a data character was in UART 104 at the time UART 104 transitioned from sampling mode to byte mode of operation, UART 104 may interpret an actual data character as a start bit. When this occurs, the data will look like garbage until the next command comes along. In order for the incoming data stream to be reliable, UART 104 needs to remain in sampling mode for the entire command. While UART 104 remains in sampling mode, clock slew must be accounted for, otherwise, the data will look like garbage.

Figure 3A:
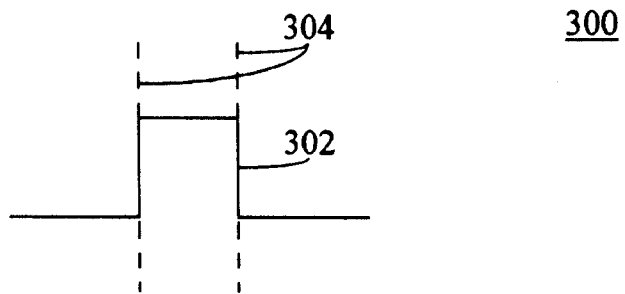
FIG. 3a is a diagram illustrating how the incoming data samples are in sync with the receiving clock when clock slew does not exist.

The present invention accounts for clock slew while the UART remains in sampling mode. Clock slew results when the transmitting device operates at a higher or lower clock rate than the receiving device. Clock slew is omnipresent because no two clocks operate at the exact same rate. FIG. 3a represents a perfectly transmitted sample in that there is no clock slew. A sample 302 is perfectly in sync with a receiving clock pulse 304 (shown in phantom using lines that indicate the leading and trailing edge of the clock pulse) from receiving device 102.

Figure 3B:
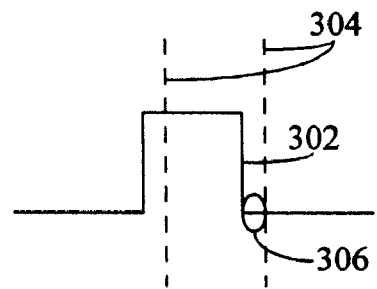
FIG. 3b is a diagram illustrating how the incoming data samples are out of sync with the receiving clock for negative clock slew.

Negative clock slew occurs when the transmitting clock is faster than the receiving clock. An example of negative clock slew is shown in FIG. 3b. Sample 302 arrives before the start of the receiving clock pulse (represented in phantom) 304. When this occurs, the present sample contains part of the next sample or bit 306.

Figure 3C:
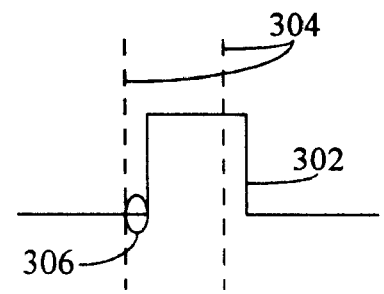
FIG. 3c is a diagram illustrating how the incoming data samples are out of sync with the receiving clock for positive clock slew.

Positive clock slew occurs when the receiving clock is faster than the transmitting clock. An example of positive clock slew is shown in FIG. 3c. Sample 302 arrives after the start of the receiving clock pulse (represented in phantom) 304. When this occurs, the present sample contains part of the previous sample or bit 306.

The present invention is described with reference to AT commands. AT commands are comprised of all ASCII characters. Although the present invention is described with reference to AT commands, the present invention may be applicable to other types of commands.

For baud rates of 9600 and above, the present invention accounts for clock slew when AT commands are transmitted by using a feature that is unique to all ASCII characters and RS-232 protocol.

Figure 4:
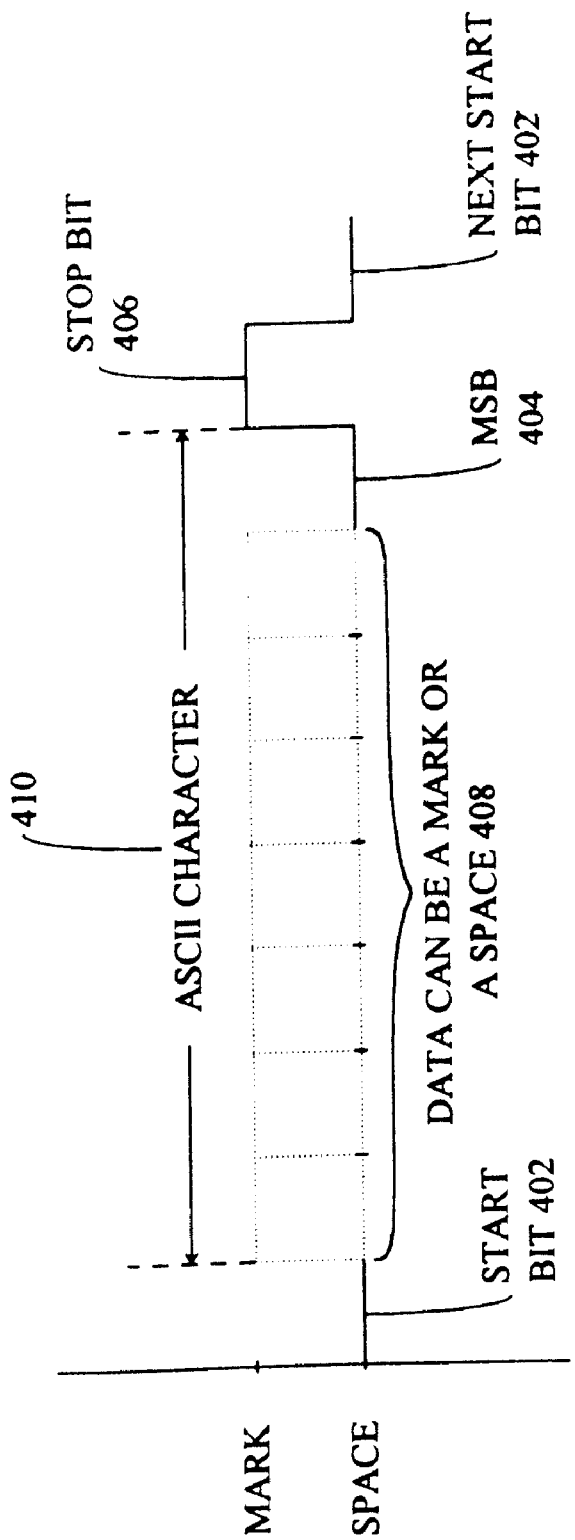
FIG. 4 is a diagram illustrating the unique features of RS232 protocol and ASCII characters.

FIG. 4 illustrates the features that are unique to RS-232 serial transmissions when the characters being transmitted represent ASCII characters. FIG. 4 represents an ASCII character 410 surrounded by a start bit 402 and a stop bit 406. ASCII character 410 is comprised of eight bits. The first seven bits 408 of ASCII character 410 can be marks, spaces, or a combination thereof. The last bit 404 of ASCII character 410 is the most significant bit (MSB). The MSB 404 of ASCII character 410 is always a space. RS-232, the EIA standard for serial transmission, requires the beginning of a character to be identified by start bit 402. Start bit 402 is always represented as a space (that is, a zero bit). The end of a character is identified by stop bit 406. Stop bit 406 is always represented as a mark (that is, a one bit). Thus, the feature unique to all ASCII characters is that stop bit 406 is surrounded by spaces: the MSB 404 to its left and the next start bit 402 to its right. Although the present invention is described using this feature, the present invention is not limited by this feature. Other types of coding methods that contain unique features among its character set can be used.

FIGS. 5a and 5b illustrate the severity of clock slew for both negative and positive slew, respectively. Four examples of negative clock slew 502, 506, 510, and 514 are shown in FIG. 5a. The sampled data is represented as stop bit 406 surrounded by MSB 404 and start bit 402. Each sample represents 8 bits. The clock of receiving device 102 is represented as two lines (shown in phantom) indicating the leading and trailing edges of clock pulse 504.

Example 502 shows the transmitting clock as being two (2) bits faster than receiving clock 504, resulting in a negative slew of –2/8. Thus, the sample contains part of the next character or next two bits. Even though the transmitting and receiving clocks are off by 2 samples, one can still discern that the sample represents a mark.

Example 506 shows the transmitting clock as being four (4) bits faster than receiving clock 504, resulting in a negative slew of –4/8. Thus, the sample contains part of the next character or next four bits. Here, one has a 50:50 chance of the sample being identified as a mark.

Example 510 shows the transmitting clock as being six (6) bits faster than receiving clock 504, resulting in a negative slew of –6/8. Thus, the sample contains part of the next character or next six bits. With the transmitting and receiving clocks off by six bits, one would be unsure as to whether the sample is a mark or a space in this instance.

Example 514 shows the transmitting clock as being eight (8) bits faster than receiving clock 504, resulting in a negative slew of −8/8. Thus, the sample contains all of the next character or next eight bits. At this point, the transmitting clock is completely out of synch with receiving clock 504. The sample will be identified as a space, and from this point on the data will look like garbage.

Four examples of positive clock slew 520, 524, 528, and 532 are shown in FIG. 5b. Example 520 shows receiving clock 504 as being two (2) bits faster than the transmitting clock, resulting in a positive slew of +2/8. Thus, the sample contains part of the previous character or previous two bits. Even though the receiving and transmitting clocks are off by 2 bits, one can still discern that the sample represents a mark.

Example 524 shows receiving clock 504 as being four (4) bits faster than the transmitting clock, resulting in a positive slew of +4/8. Thus, the sample contains part of the previous character or previous four bits. Here, one has a 50:50 chance of the sample being identified as a mark.

Example 528 shows receiving clock 504 as being six (6) bits faster than the transmitting clock, resulting in a positive slew of +6/8. Thus, the sample contains part of the previous character or previous six bits. With the receiving and transmitting clocks off by six bits, one would be unsure as to whether the sample is a space or a mark in this instance.

Example 532 shows receiving clock 504 as being eight (8) bits faster than the transmitting clock, resulting in a positive slew of +8/8. Thus, the sample contains all of the previous character or previous eight bits. At this point, receiving clock 504 is completely out of sink with the transmitting clock. The sample will be identified as a space, and from this point on the data will look like garbage.

The present invention solves the above slew problem by keeping track of the current slew and reconstructing the next sample using a portion of the preceding sample and a portion of the new sample. Prior to a situation in which negative slew results in the misinterpretation of a sample (that is, where you are getting more and more data from the next character or bit(s)), such as examples 510 and 514 (shown in FIG. 5a), receiving device 102 will skip taking a sample in order to get back in synch with the transmitting clock. Prior to a situation in which positive slew results in the misinterpretation of a sample (that is, where you are getting more and more data from the previous character or bit(s)), such as examples 528 and 532 (shown in FIG. 5b), receiving device 102 will take an additional sample in order to get back in synch with the transmitting clock.

Figure 6:
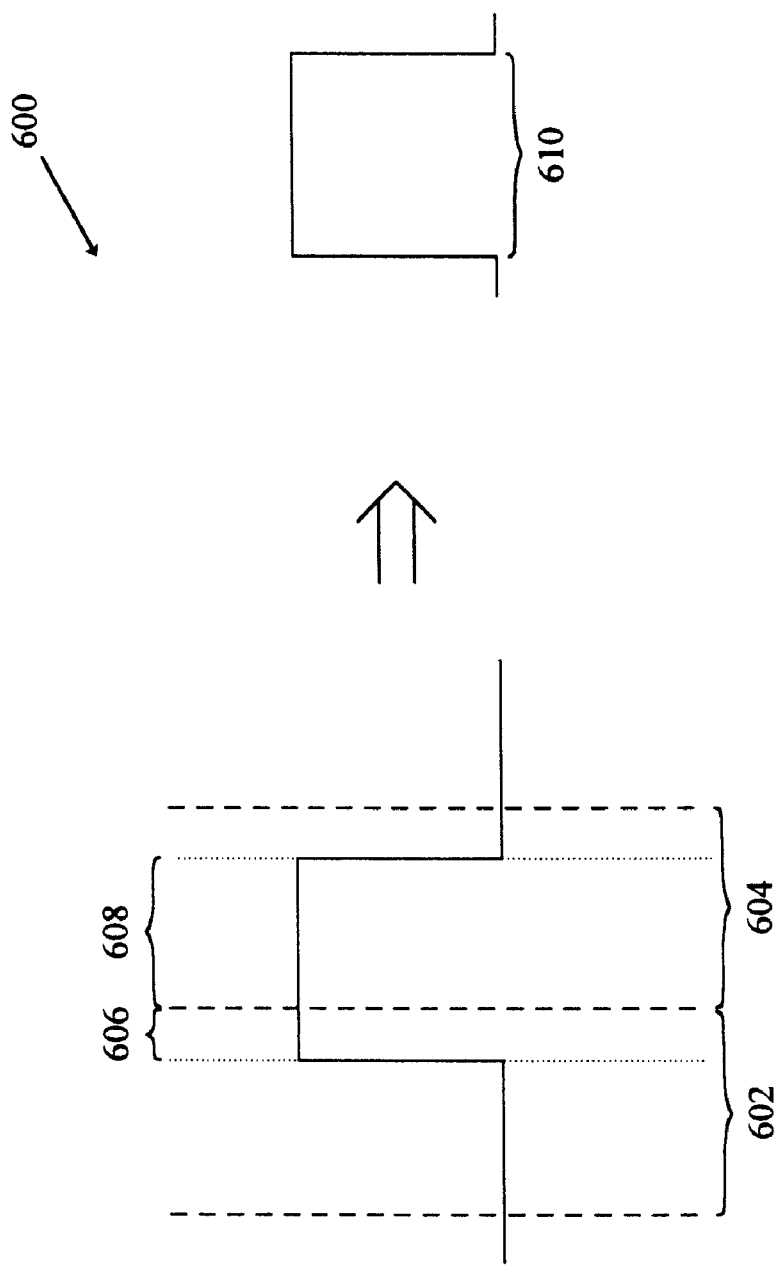
FIG. 6 is a diagram illustrating the reconstruction of an actual sample from a previous sample and a present sample.

FIG. 6 is an illustration of the reconstruction of an actual sample by using a portion of the preceding sample and a portion of the new sample. A first sample 602 contains a portion of the next character or bits 606. First sample 602 is saved. Upon receiving a second sample 604, first sample 602 becomes a preceding sample 602. Second sample or new sample 604 contains the remaining portion of the character or bits 608 that are used to reconstruct actual sample 610. Thus, actual sample 610 is comprised of bits 606 from preceding sample 602 and bits 608 from new sample 604.

Actual sample 610 is reconstructed by combining preceding sample 602 shifted right by an amount (k−n) with second sample 604 shifted left by an amount n:

Actual Sample = (preceding sample >> (k−n)) | (new sample<< n), where     k = number of bits sampled; and n = amount of slew.

Figure 7:
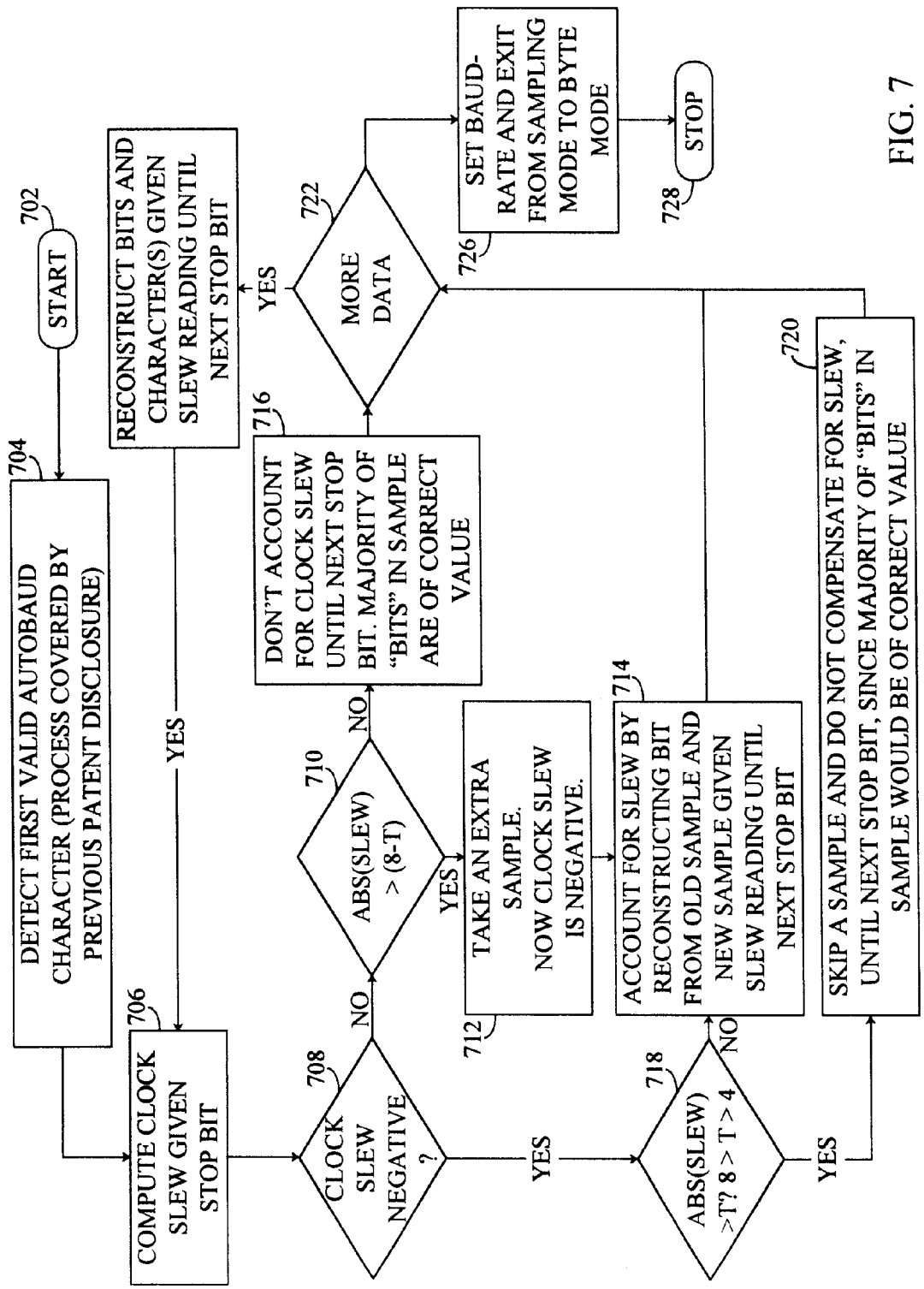
FIG. 7 is a flow diagram illustrating a method used to account for clock slew during serial data transmission when the bit rate of the incoming data stream is 9600 or above.

FIG. 7 represents a flow diagram of the method used to account for slew during serial data transmission when UART 104 operates in sampling mode and the bit rate of the incoming data stream is 9600 or greater. The process begins with step 702 where control is passed to step 704.

In step 704, the determination of whether the starting character corresponds to an 'A', 'a', or '~' is made. Once the starting character is known, the baud rate is determined. The determination of whether the starting character corresponds to an 'A', 'a', or '~' as well as the detection of the baud rate during autobauding is disclosed in the above-referenced copending application "UART Based Autobauding Without Data Loss". Control then passes to step 706.

In step 706, clock slew is calculated using stop bit 406, which is surrounded by MSB 404 and start bit 402. Clock slew is calculated using a look-up table. The value of the sampled data is read. This value is used to look up the corresponding clock slew in the look-up table. For example, when there is no clock slew, the sampled data is read in as FF. FF on the look-up table corresponds to 0 (zero) slew. Control then passes to decision step 708.

In decision step 708, it is determined whether negative clock slew exists. If negative clock slew does exist, control passes to decision step 718. In decision step 718, it is determined whether the absolute value of negative clock slew is greater than the threshold. The threshold value ranges from 4 bits<T<8 bits. If the absolute value of clock slew is within the threshold range, control passes to step 720.

In step 720, a sample is skipped. Clock slew compensation is performed when the next feature occurs. Control then passes to step 722.

Returning to decision step 718, if the absolute value of clock slew is not within the threshold range, control passes to step 714. In step 714, clock slew is accounted for by reconstructing bit(s) from the old sample and the new sample for the given slew reading until the next feature occurs. Control then passes to step 722.

Returning to decision step 708, if negative clock slew does not exist, control passes to decision step 710. In decision step 710, it is determined whether the absolute value of clock slew is greater than the quantity (8-T), where T represents the threshold value or, in other words, whether positive clock slew exists. The threshold value, T, ranges from 4 bits<T<8 bits. If positive slew reading is greater than (8-T), control passes to step 712.

In step 712, an extra sample is taken. The taking of an extra sample transforms positive clock slew into negative clock slew. Transforming positive clock slew into negative clock slew in the manner stated above, allows one method of accounting for slew to be used for both positive and negative slew. Control then passes to step 714.

In step 714, clock slew is accounted for by reconstructing bit(s) from the old sample and the new sample for the given slew reading until the next feature occurs. Control then passes to step 722.

Returning to decision step 710, if positive clock slew is not greater than (8-T), control passes to step 716. In step 716, clock slew is not accounted for until the next feature occurs. Positive slew is not severe enough to result in misinterpretation of incoming data. Control then passes to step 722.

In step 722, it is determined whether more data exists. If more data does exist, control passes to step 724.

In step 724, clock slew is accounted for by reconstructing bit(s) and character(s) from the incoming data stream using the clock slew reading until the next feature occurs. A table look-up is performed on the bit after having been reconstructed using slew information. The table contains all of the possible ways in which continuous strings of one's can be found in an 8 bit string. Thus, instead of having 256 entries, the table is comprised of 38 entries. If there are more one's than zero's, the sample represents a mark. Otherwise, the sample represents a space. If a match is not found, an error has occurred. Control then passes to step 706 where clock slew is computed for the next feature and the process stated above repeats itself.

Returning to step 722, if more data is not available, control is passed to step 726. In step 726, the baud rate is set and UART 104 terminates sampling mode and enters into byte mode. Control then passes to step 728. In step 728, the process stops.

The method described above applies to bit rates of 9600 and above. UART 104, operating in sampling mode at 9600 baud, generates one group of 8 samples per bit at a bit rate of 19,200, two groups of 8 samples or 16 samples per bit at a bit rate of 9600, four groups of 8 samples or 32 samples per bit at a bit rate of 4800, eight groups of 8 samples or 64 samples per bit at a bit rate of 2400, and sixteen groups of 8 samples or 128 samples per bit at a bit rate of 1200. Thus, at the lower bit rates, multiple groups of 8 samples per bit exist.

For bit rates lower than 9600, that is 1200, 2400, and 4800, the stop bit feature is not applicable because the lower bit rates have less stop bits over time. For example, at a bit rate of 19,200 one byte of data is a certain length. A byte of data at a bit rate of 9600 is twice as long as it would be at a bit rate of 19,200, giving rise to half the number of stop bits. At a bit rate of 4800, the data is four times as long, giving rise to one-fourth the number of stop bits, and so on. By the time one encounters a stop bit at these lower bit rates, clock slew could be irreparable. Thus, the amount of slew, given the number of stop bits, is greater for the lower bit rates.

Initially, clock slew is most prominent at the boundaries of a sample because samples from previous bits or the next bit(s) first appear at the boundaries of a current sample. As time goes on, clock slew shifts left or right until it encompasses the entire sample. Clock slew, therefore, does not affect the middle portion of a sample until much later. Thus, for lower bit rates in which more than two groups of 8 samples represent a bit, the present invention reads the center group of 8 samples. This centering technique is done using the start bit. By reading from the middle group of 8 samples, one automatically negates the effect of slew.

Figure 8:
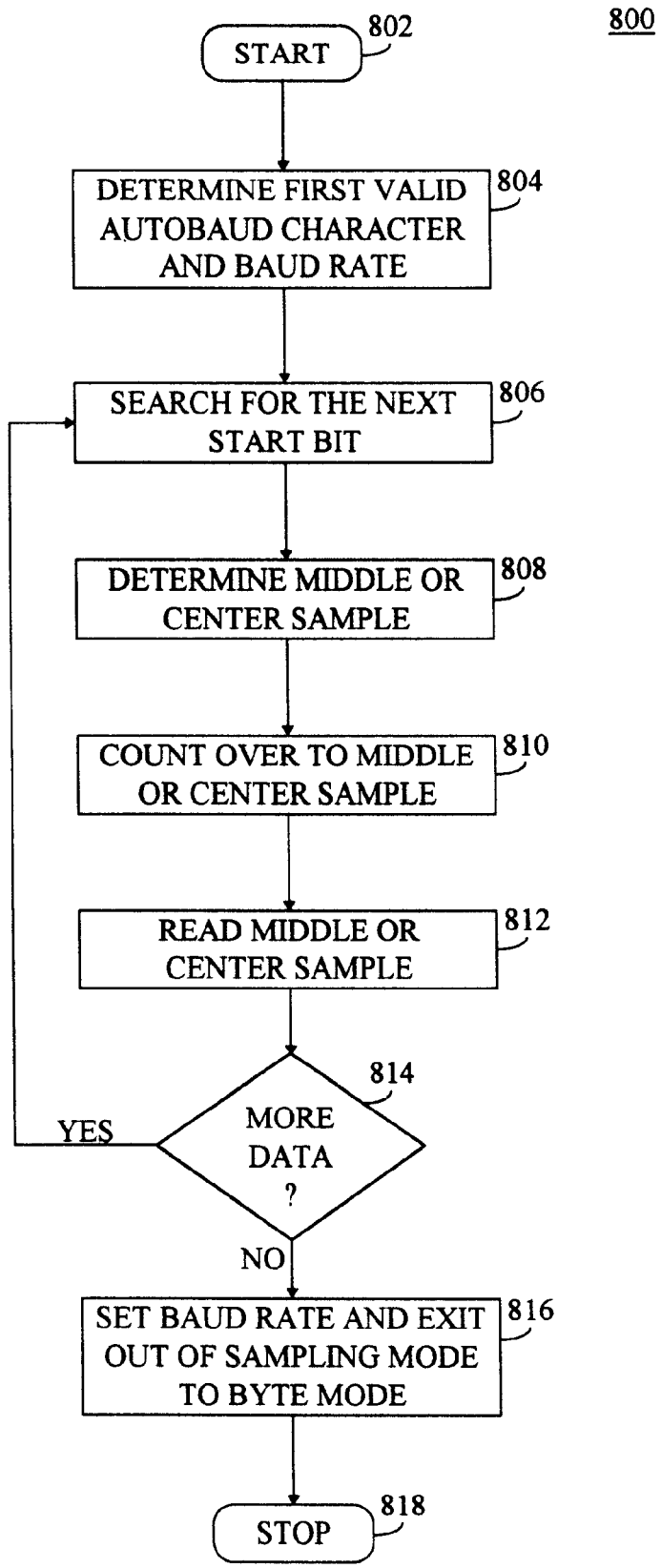
FIG. 8 is a flow diagram illustrating a method used to account for clock slew during serial data transmission when the bit rate of the incoming data stream is less than 9600.

FIG. 8 represents a flow diagram of the method used to account for slew during serial data transmission when UART 104 operates in sampling mode and the bit rate of the incoming data stream is less than 9600. The process begins with step 802 where control is passed to step 804.

In step 804, the determination of whether the starting character corresponds to an 'A', 'a', or '~' is made. Once the starting character is known, the baud rate is determined. The determination of whether the starting character corresponds to an 'A', 'a', or '~' as well as the detection of the baud rate during autobauding is disclosed in the above referenced copending application "UART Based Autobauding Without Data Loss". Control then passes to step 806.

In step 806, after previous stop bit 404 is encountered, start bit 402 is searched. This is accomplished by searching for a first group of 8 samples where the majority of the samples are spaces. Control then passes to step 808.

In step 808, it is determined which group of 8 samples is the middle sample. For example, at a bit rate of 4800 there are four groups of 8 samples. The middle samples are the second and third groups of 8 samples. Thus, it would be determined that the second group of 8 samples is the middle sample. At a bit rate of 2400, the fourth group of 8 samples would be chosen, and at 1200, the eighth group of 8 samples would be chosen. Control then passes to step 810.

In step 810, the middle sample is found by counting over the appropriate number of groups of 8 samples. Control passes to step 812.

In step 812, the middle sample is read to negate the effects of slew. Control is then passed to decision step 814.

In decision step 814, it is determined whether more data is available. If more data is available, control is returned to step 806. If more data is not available, control passes to step 816.

In step 816, the baud rate is set and UART 104 exits out of sampling mode to enter into byte mode of operation. Control then passes to step 818 where the process ends.

Note that at a bit rate of 19,200, the centering technique would not apply because multiple groups of 8 samples per bit does not exist. Although two groups of 8 samples per bit do exist at a bit rate of 9600, there are no middle groups of 8 samples per bit. Both groups of 8 samples exist at the boundaries and are possibly encroached upon by previous bits or the next bit(s). Thus, the centering method does not apply to bit rates of 9600 and above.

CONCLUSION

While the present invention is described in terms of a cellular telephone, the present invention is also applicable to other communication devices that employ universal asynchronous receiver transmitters (UARTs) or universal synchronous/asynchronous receiver transmitters (USARTs). The previous description of the preferred embodiments is provided to enable any person skilled in the art to make or use the present invention. While the invention has been particularly shown and described with reference to preferred embodiments thereof, it will be understood by those skilled in the art that various changes in form and detail may be made therein without departing from the spirit and scope of the invention.

What is claimed is:

1. A method for correcting clock slew in serial communications, comprising the steps of:
   receiving a sample containing a predetermined feature from an incoming data stream, wherein a baud rate for said incoming data stream is determined to be at least 9600;
   calculating clock slew using said predetermined feature;
   determining whether said clock slew is negative;
   determining whether said clock slew is positive, if said clock slew is not negative;
   compensating for one of said negative and positive clock slew, if one of said negative and positive clock slew exists;
   determining whether said sample represents one of a mark and a space; and
   reconstructing bits and characters from said incoming data stream, based on said clock slew calculation until said predetermined feature occurs again, if there are more samples in said incoming data stream.

2. The method of claim 1, further comprising the step of setting said baud rate and exiting out of sampling mode, if there are no more samples in said incoming data stream.

3. The method of claim 1, further comprising the step of returning to said calculating step, if there are more samples in said incoming data stream.

4. The method of claim 1, wherein said step of compensating for negative clock slew comprises the steps of:
   determining whether an absolute value of negative clock slew exceeds a threshold value;
   reconstructing bits from an old sample and a new sample, based on said slew calculation, until said predetermined feature occurs again, if said absolute value of negative clock slew does not exceed said threshold value; and
   skipping a sample, if said absolute value of negative clock slew exceeds said threshold value.

5. The method of claim 4, wherein said threshold value is between 4 and 8 bits.

6. The method of claim 5, wherein said threshold value is 6 bits.

7. The method of claim 1, wherein said step of compensating for positive clock slew comprises the steps of:
   determining whether an absolute value of positive clock slew exceeds the quantity (k-T), wherein k is the sample size and T is a threshold value;
   taking an extra sample, if said absolute value of positive clock slew exceeds (k-T);
   reconstructing bits from an old sample and a new sample, based on said slew calculation, until said predetermined feature occurs again, and
   if said absolute value of positive clock slew exceeds (k-T).

8. The method of claim 7, wherein said threshold value is between 4 and 8 bits.

9. The method of claim 8, wherein said threshold value is 6 bits.

10. The method of claim 7, wherein said sample size, k, is 8.

11. A system for correcting clock slew in serial communications, comprising:
    means for receiving a sample containing a predetermined feature from an incoming data stream, wherein a baud rate for said incoming data stream is determined to be at least 9600;
    means for calculating clock slew using said predetermined feature;
    means for determining whether said clock slew is negative;
    means for determining whether said clock slew is positive, if said clock slew is not negative;
    means for compensating for one of said negative and positive clock slew, if one of said negative and positive clock slew exists;
    means for determining whether said sample represents one of a mark and a space; and
    means for reconstructing bits and characters from said incoming data stream, based on said clock slew calculation until said predetermined feature occurs again, if there are more samples in said incoming data stream.

12. The system of claim 11, further comprising means for setting said baud rate and exiting out of sampling mode, if there are no more samples in said incoming data stream.

13. The system of claim 11, wherein said means for compensating for negative clock slew comprises:
    means for determining whether an absolute value of negative clock slew exceeds a threshold value;
    means for reconstructing bits from an old sample and a new sample, based on said slew calculation, until said predetermined feature occurs again, if said absolute value of negative clock slew does not exceed said threshold value; and
    means for skipping a sample, if said absolute value of negative clock slew does exceed said threshold value.

14. The system of claim 13, wherein said threshold value is between 4 and 8 bits.

15. The system of claim 14, wherein said threshold value is 6 bits.

16. The system of claim 11, wherein said means for compensating for positive clock slew comprises:
    means for determining whether an absolute value of positive clock slew exceeds the quantity (k-T), wherein k is the sample size and T is a threshold value;
    means for taking an extra sample, if said absolute value of positive clock slew exceeds (k-T); and
    means for reconstructing bits from an old sample and a new sample, based on said slew calculation, until said predetermined feature occurs again, if said absolute value of positive clock slew exceeds (k-T).

17. The system of claim 16, wherein said threshold value is between 4 and 8 bits.

18. The system of claim 17, wherein said threshold value is 6 bits.

19. The system of claim 16, wherein said sample size, k, is 8.

20. A method of correcting clock slew in serial communications, comprising:
    receiving a sample from an incoming data stream, wherein a baud rate for said incoming data stream is determined to be less than 9600;
    searching for a start bit from said sample;
    determining a center portion of said sample; counting over to said center portion of said sample; and
    correcting for slew by reading said counted center portion of said sample.

21. The method of claim 20, further comprising the steps of:
    determining whether more data is available;
    returning to said searching step, if more data is available; and
    setting said baud rate and exiting out of sampling mode, if more data is not available.

22. The method of claim 20, wherein said searching step comprises the step of finding a group of bits having a majority of spaces.

23. A system for correcting clock slew in serial communications, comprising:
    means for receiving a sample from an incoming data stream, wherein a baud rate for said incoming data stream is determined to be less than 9600;
    means for searching for a start bit from said sample;
    means for determining a center portion of said sample;
    means for counting over to said center portion of said sample; and
    means for correcting for slew by reading said counted center portion of said sample.

24. The system of claim 23, further comprising:
    means for determining whether more data is available; and
    means for setting said baud rate and exiting out of sampling mode, if more data is not available.

25. The system of claim 23, wherein said means for searching comprises means for finding a group of bits having a majority of spaces.

* * * * *